Nov. 17, 1942.  J. A. ANTONELLI  2,301,993

OIL SEAL

Filed Oct. 29, 1941

INVENTOR.
Joseph A. Antonelli

Patented Nov. 17, 1942

2,301,993

UNITED STATES PATENT OFFICE 2,301,993

OIL SEAL

Joseph A. Antonelli, Elgin, Ill., assignor to Victor Manufacturing & Gasket Company, Chicago, Ill., a corporation of Illinois Application October 29, 1941, Serial No. 416,984

2 Claims. (Cl. 288—3)

The present invention relates to an oil seal or grease retainer adapted to seal the opening or space provided between relatively rotatable parts such as a shaft and its surrounding housing.

The novel invention resides in an oil seal or grease retainer having a relatively thin, substantially channel-shaped retaining shell formed of a sheet of metal, a plastic sealing member mounted within the channel-shaped shell and a substantially L-shaped reinforcing channel molded to the exterior of the plastic sealing member at a corner thereof so as to stabilize and strengthen the plastic member and prevent its becoming disengaged from the shell.

The invention further comprehends auxiliary means for preventing the plastic sealing member from rotating within its shell. This is accomplished by suitably notching or punching from the shell spaced projections or prongs and embedding them within the plastic sealing member, with alternate projections or prongs reversed in position to overcome any tendency of this member turning in the confines of the shell.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
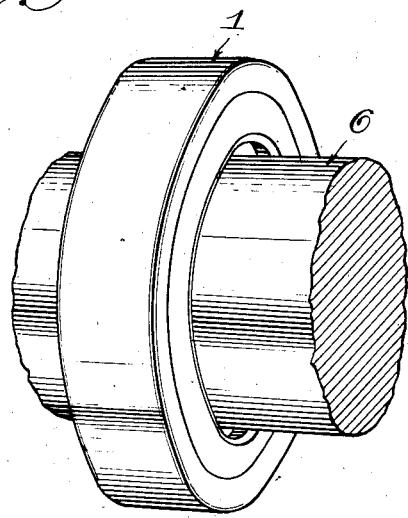
Figure 1 is a view in perspective of the novel oil seal surrounding a rotatable shaft.
Figure 2:
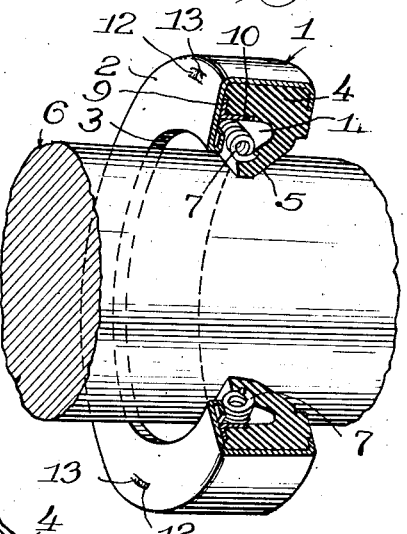
Figure 2 is a perspective view of the oil seal but showing the side opposite from that shown in Figure 1 and with parts broken away to more clearly show its inner construction.
Figures 3, 5:
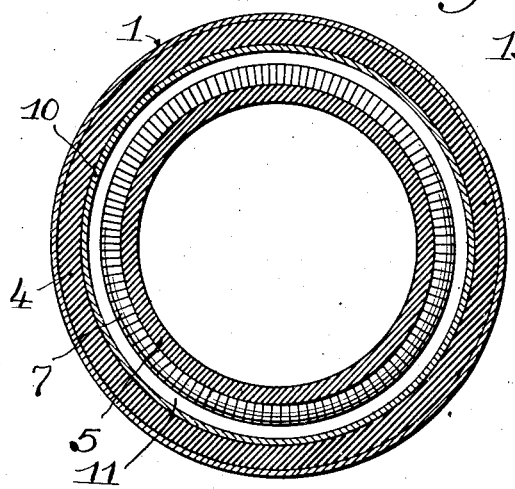
Figure 3 is a view in vertical cross section through the complete seal taken in a plane represented by the line 3—3 of Figure 4.
Figure 5 is a fragmentary enlarged view in vertical cross section taken on the line 5—5 of Figure 4.
Figure 4:
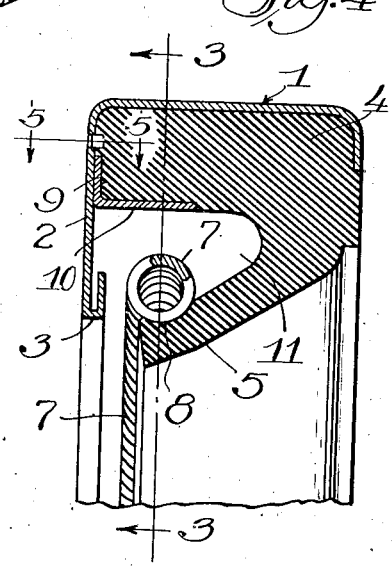
Figure 4 is an enlarged fragmentary view in vertical cross section of the novel oil seal.

Referring more particularly to the disclosure in the drawing, the novel oil seal comprises a retaining shell 1 formed of substantially channel-shape with one of the sides 2 of greater depth and inturned as at 3. Mounted within this shell by a press fit is a plastic sealing element having a body portion 4 bridging the opposite sides of the shell and an angularly disposed lip 5 adapted to contact with a rotatable shaft 6. A contractile garter spring 7 seating within a depression 8 adjacent the outer or free edge of the sealing lip maintains this sealing lip in continuous wiping and sealing contact with the shaft under all operating conditions.

Although the body of the plastic sealing member is initially secured in the retaining shell by a press fit, it may have a tendency to shrink and become loose. This is prevented in my novel construction by the addition of a reinforcement in the form of an L-shaped channel molded to the surface of the body portion 4 at one corner thereof with one leg 9 disposed against the interior of one side of the shell and the other leg 10 disposed within the channel 11 provided for the garter spring 7. This reinforcing channel stabilizes and retains the plastic sealing member in its proper place.

The novel invention provides an auxiliary means for overcoming any possible tendency of the sealing member turning in its shell. This is accomplished after the shell is closed about the sealing element and comprises placing the seal in a kicker press or the like and a plurality of notches are cut or stamped into the shell in spaced relation. In forming these notches the metal punched therefrom is divided into a relatively long prong or projection 12 and a relatively short prong or projection 13 both of which are embedded by the force of the press into the plastic material. The prongs or projections 12 and 13 of alternate notches are reversed so as to securely anchor the plastic sealing element in its retaining shell and overcome any tendency of this sealing member to rotate or turn within the shell.

The sealing element is formed of a moldable plastic and resilient material, preferably one of the synthetic rubbers which have excellent oil and heat resisting properties.

Although the drawing discloses an oil seal or grease retainer of the internal type in which the retaining shell is mounted within a housing surrounding the shaft and the sealing member has a wiping and sealing contact with the shaft, it will be readily understood and appreciated that the parts may be reversed to provide an external type seal with the retaining shell pressed onto the shaft and the sealing lip extending outwardly to have a sealing contact with the interior of the surrounding housing. In that event, the spring would be of the expanding type rather than of the contractile type used in an internal seal.

Having thus disclosed the invention, I claim:

1. An oil seal comprising a one-piece, substantially channel-shaped retaining shell, a resilient sealing member mounted within the shell between the opposite sides thereof by a press fit, a substantially L-shaped reinforcing channel molded onto adjoining sides of the sealing member with one side of said reinforcing channel lying in parallel abutting relation with the inner face of one side of the shell for preventing shrinkage and loosening of the sealing element from its mounting within the shell, and spaced notches provided in the shell adjacent the last mentioned side of said reinforcing channel, said notches each consisting of oppositely extending projections of unequal length embedded in the body of the sealing member and with the length of projections reversed in adjacent notches to anchor the sealing member against rotation in the shell.

2. An oil seal comprising a substantially channel-shaped retaining shell having one of its side walls of greater depth than the other, a resilient sealing member clamped between the opposed side walls of the retaining shell, and a substantially L-shaped reinforcing channel molded to adjoining sides of the sealing member and having one of its sides in parallel abutting relation with the side wall of the shell having the greater depth, to prevent shrinkage of the sealing member under operating conditions to an extent sufficient to loosen said sealing member from its clamped position within the shell.

JOSEPH A. ANTONELLI.